United States Patent Office 3,365,424
Patented Jan. 23, 1968

3,365,424
COLOR IMPROVED POLYMERIC POLYESTER
COMPOSITIONS OF MATTER AND METHOD
OF PREPARING SAME
Morris Dunkel, Paramus, N.J., assignor to Universal Oil Products Company, Des Plaines, Ill., a corporation of Delaware
No Drawing. Filed Apr. 20, 1964, Ser. No. 361,249
16 Claims. (Cl. 260—75)

ABSTRACT OF THE DISCLOSURE

A color improved polyester resin comprising the reaction product of a polyhydric alcohol, a polybasic compound, a polyhalopolyhydromethanonaphthalenedicarboxylic acid, and phosphoric acid, exemplified by the reaction product of diethylene glycol, maleic anhydride, 5,6,7,8,9,9-hexachloro-1,2,3,4,4a,5,8,8a-octahydro-5,8 - methano-2,3-naphthalenedicarboxylic anhydride and phosphoric acid.

This invention relates to new polymeric compositions of matter and to the method of their preparation. More particularly, this invention relates to color improved unsaturated polyester resins containing as one component thereof, a polyhalopolyhydromethanonaphthalenedicarboxylic compound and containing as an additional component thereof, phosphoric acid and to the method of their preparation.

Unsaturated polyester resins are of great commercial importance. They possess highly desirable physical properties and find wide utility in the plastic materials of commerce. Utilization of these versatile resins, however, have been greatly limited in areas of application where sparks, open flames and fire are likely to exist or occur, such as for example, in electrical wiring, appliances or cooking utensils or where safety regulations prohibit utilization of polyester-based materials, such as for example, building codes for construction panels, piping and fuel tanks. These areas of application have, however, recently been opened to polyester resins through the development of fire- or flame-retardant unsaturated polyester resins.

A recently developed and most satisfactory flame-retardant polyester resin is a polyester resin which contains as one chemically combined component thereof, a polyhalopolyhydromethanonaphthalenedicarboxylic compound. It is to this particular polyester resin which the improvement of this invention is directed. While this specific polyester resin possesses the highly desirable property of flame-retardancy, it has, in many of its formulations, not been as light colored as is desirable for many of the polyester resin applications of commerce. For example, in articles, such as, protective coatings and films, and glass-filled structural pieces for walls and ceilings where appearance in respect to color is an essential requirement, the plastic materials prepared from polyester resins containing a polyhalopolyhydromethanonaphthalenedicarboxylic compound have not been completely acceptable. This is so even though such materials possess the required flame-retardancy, because of their relative lack of light color. It has now been discovered that these flame-retardant polyester resins can be greatly improved in respect to their color by the addition thereto of a small amount of phosphoric acid.

It is therefore an object of this invention to produce new flame-retardant compositions of matter having desirable properties with respect to color. Another object of this invention is to provide new compositions of matter by reacting phosphoric acid with polyester forming materials and a polyhalopolyhydromethanonaphthalenedicarboxylic compound. A further and more specific object of this invention is to produce color improved unsaturated polyester resins containing as one chemically combined component thereof 5,6,7,8,9,9-hexachloro-1,2,3,4,4a,5,8,8a-octahydro-5,8-methano - 2,3 - naphthalenedicarboxylic anhydride and containing phosphoric acid as an additional, color improving, component. A still further and more specific object of this invention is to provide color improved unsaturated polyester resins by reacting phosphoric acid with polyester forming materials and 5,6,7,8,9,9-hexachloro - 1,2,3,4,4a,5,8,8a - octahydro-5,8-methano-2,3-naphthalenedicarboxylic anhydride.

Taken in its broadest aspect, one embodiment of this invention resides in a color improved polyester resin comprising the reaction product of at least one polyhydric alcohol, a polybasic compound selected from the group consisting of polybasic acids, anhydrides and esters thereof, a halogen-containing compound selected from the group consisting of polyhalopolyhydromethanonaphthalenedicarboxylic acids, anhydrides and esters thereof, and phosphoric acid.

A further embodiment of this invention resides in a method of preparing a color improved polyester resin comprising reacting at polymerization conditions, at least one polyhydric alcohol, a polybasic compound selected from the group consisting of polybasic acids, anhydrides and esters thereof, a halogen-containing compound selected from the group consisting of polyhalopolyhydromethanonaphthalenedicarboxylic acids, anhydrides and esters thereof and phosphoric acid.

A further and more specific embodiment of this invention resides in a color improved unsaturated polyester resin comprising the reaction product of ethylene glycol, diethylene glycol, maleic anhydride, 5,6,7,8,9,9 - hexachloro - 1,2,3,4,4a,5,8,8a - octahydro - 5,8 - methano-2,3-naphthalenedicarboxylic anhydride and phosphoric acid.

A still further and more specific embodiment of this invention resides in a method of preparing a color improved unsaturated polyester resin comprising reacting at polymerization conditions, ethylene glycol, diethylene glycol, maleic anhydride, 5,6,7,8,9,9-hexachloro-1,2,3,4,4a, 5,8,8a - octahydro-5,8-methano-2,3-naphthalenedicarboxylic anhydride and phosphoric acid.

These and other objects and embodiments of this invention will be found in the following further detailed description.

As hereinbefore set forth, this invention is directed to color improved unsaturated polyester resins having as one chemically combined component thereof, a polyhalopolyhydromethanonaphthalenedicarboxylic compound, and also containing phosphoric acid, as an additional, color improving, component. The polyester resins of this invention are unsaturated, and, as is well understood in the art, are resins which are capable of further reaction, such as for example, by copolymerization with monomers having vinyl-unsaturation. These resins are also identified in the art as resins which contain copolymerizable carbon to carbon double bonds imparted to the resin through at least one of its components. These polyesters must, of course, contain as one component thereof, a polyhalopolyhydromethanonaphthalenedicarboxylic compound, but otherwise may be composed of any of the unsaturated polyester resin constituents known in the art which are hereinafter more fully identified and described.

As hereinbefore indicated, unsaturated polyester resins do not, by themselves, have fire- or flame-retardant properties and to impart such properties, it is necessary to incorporate into the resins an additional component which induces these desired properties. Highly satisfactory compounds for this purpose, as the additional component, are polyhalopolyhydromethanonaphthalenedicarboxylic compounds which consist of polyhalopolyhydromethanonaphthalenedicarboxylic acids, anhydrides or esters thereof. Examples of these compounds include 5,6,7,8,9,9-hexachloro-1,2,3,4,4a,5,8,8a-octahydro-5,8-methano-2,3-naphthalenedicarboxylic acid,
5,6,7,8,9,9-hexachloro-1,2,3,4,4a,5,8,8a-octahydro-5,8-methano-2,3-naphthalenedicarboxylic anhydride,
di-(lower alkyl esters, having 1 to 5 carbon atoms of 5,6,7,8,9,9-hexachloro-1,2,3,4a,5,8,8a-octahydro-5,8-methano-2,3-naphthalenedicarboxylic acid,
5,6,7,8,9,9-hexabromo-1,2,3,4,4a,5,8,8a-octahydro-5,8-methano-2,3-naphthalenedicarboxylic acid,
5,6,7,8,9,9-hexabromo-1,2,3,4,4a,5,8,8a-octahydro-5,8-methano-2,3-naphthalenedicarboxylic anhydride,
di-lower alkyl) esters having 1 to 5 carbon atoms of 5,6,7,8,9,9-hexabromo-1,2,3,4,4a,5,8,8a-octahydro-5-8-methano-2,3-naphthalenedicarboxylic acid.

Compounds having mixtures of halo substituents, such as for example, 9,9-dibromo-5,6,7,8-tetrachloro-1,2,3,4,4a,5,8,8a - octahydro-5,8-methano-2,3-naphthalenedicarboxylic anhydride are also suitable.

To induce a satisfactory level of flame-retardancy to the polyester resins, the polyhalopolyhydromethanonaphthalenedicarboxylic compounds, either individually or in admixture, are incorporated into the resins in an amount of from about 20 to about 75 weight percent of the final resin. As hereinafter more fully described, these compounds may be incorporated into the polyester resins at any point during their preparation, although, for the purpose of the color improvement according to this invention, it is generally desirable to incorporate the polyhalopolyhydromethanonaphthalenedicarboxylic compound into the resin after the addition of the phosphoric acid.

As hereinabove indicated, polyester resins which contain a polyhalopolyhydromethanonaphthalenedicarboxylic compound, as a flame-retardant, inducing component, have, in many of their formulations, been darker than is desirable for many of the polyester based plastic applications of commerce. The reason for the darkening of polyester resins containing a polyhalopolyhydromethanonaphthalenedicarboxylic compound is not completely understood. It has been known that the chemical combination of halogen-containing compounds such as, for example, tetrachlorophthalic acid or anhydride, with polyester resins has resulted in a darkening and clouding of the resins. One suggested explanation for this phenomenon was that the halogen portion of the addition compound is partially liberated during the formation of the resin and in some fashion inter-reacts with the other resin components forming highly colored and dark halo-organic compounds. In contrast, however, to the many halogen-containing compounds which have been incorporated into polyesters, the polyhalopolyhydromethanonaphthalenedicarboxylic compounds have been found not to darken and generally not to cloud the resins to the same extent, but the resins containing these compounds, nevertheless, are still not as completely satisfactory as is desirable for the commercial applications where light color and high transparency are required in combination with flame-retardant properties.

The color of polyester resins containing a polyhalopolyhydromethanonaphthalenedicarboxylic compound is improved according to the present invention by the addition of a small quantity of phosphoric acid to the resin during its preparation. This improvement is a relative one. By this is meant that the color of the resins of this invention, containing phosphoric acid, are lighter than the polyester resins prepared from similar formulations which do not contain phosphoric acid. Moreover, the color improvement of this invention is an improvement in the basic color of the resins as they are prepared and is to be distinguished from a stabilizing or protecting of the resins against any darkening or clouding which results from a breaking down of the resins, after preparation, precipitated by the effects of light and/or high heat.

The precise reason for the color improvement of this invention is not completely understood at this time. One possible explanation, based upon present understanding of halogen-containing polyester resins, is that the presence of the phosphoric acid, through some unknown mechanism, stabilizes or protects the halogen portions of the polyhalopolyhydromethanonaphthalenedicarboxylic compound from inter-reacting with the other components of the resin during its preparation, and thus prevents the formation of highly colored, dark halo-organic compounds.

According to this invention, the phosphoric acid is incorporated into the polyester resin by adding the phosphoric acid to the resin during its preparation in a quantity sufficient to impart to the final resin a phosphoric acid content of from about 0.5 to about 4 weight percent. The amount of phosphoric acid in the resin may be varied within these limits without substantial effect upon color or transparency; the exact amount for any particular polyester generally being dependent upon its formulation and the ultimately desired physical properties of the final resin. The phosphoric acid added to the resin does not completely remain as such in the final resin, but is believed to, at least partially, inter-react with the other resin components, such as for example, by formation of esters with the polyhydric alcohols. Accordingly, the weight percent of phosphoric acid, is based upon the amount of phosphoric acid added to the resin, less any amount lost during the preparation. As hereinafter more fully described, the phosphoric acid may be added to the resin at any point during its preparation, preferably, however, for better color, prior to the incorporation of the polyhalopolyhydromethanonaphthalenedicarboxylic compound.

The phosphoric acids which are suitable for use in the present invention are any of the commercially available grades and forms of the acid such as for example, ortho-, pyro-, or meta-, phosphoric acid or mixtures thereof and include acid precursors, such as phosphorous pentoxide. When the phosphoric acid is added as an aqueous solution the concentration of acid used can be varied, but generally it is desirable to use a rather concentrated acid of about 70 percent or more by weight, to avoid introducing excess water into the resin during its preparation.

The unsaturated polyester resins, which contain a polyhalopolyhydromethanonaphthalenedicarboxylic compound and which are improved by the addition thereto of phosphoric acid during their preparation are basically the reaction products of polyhydric alcohols and polybasic compounds, at least one of which contains a carbon to carbon double bond which during the reaction is retained unbroken and imparts unsaturation to the final resin.

Examples of polyhydric alcohols include 2-butenediol-1,4,
glycerol,
ethylene glycol,
pentaerythritol,
propylene glycol,
butanediol-1,4,
diethylene glycol,
bisphenol A,
hydrogenated bisphenol A,
neopentyl glycol,
butylene glycol-2,3:1,4:1,3,
pentanediol (1,5),
triethylene glycol,
dipropylene glycol,
tripropylene glycol, or
isopropylidene bis (p-phenyleneoxypropanol-2).

In this specification and appended claims, the term, polybasic compounds comprises polybasic acids, anhydrides or esters thereof. Examples of polybasic acids or anhydrides thereof include maleic anhydride,
maleic acid,
fumaric acid,
citraconic acid,
itaconic acid,
tetrachlorophthalic acid,
endo-methylene-tetrahydrophthalic anhydride,
phthalic anhydride,
phthalic acid,
isophthalic acid,
tetrahydrophthalic anhydride,
hexahydrophthalic anhydride,
succinic anhydride,
succinic acid,
adipic acid,
azelaic acid,
sebacic acid,
glutaric acid, or
pimelic acid.

Examples of polybasic esters or esters of polybasic acids include the di-(lower alkyl) esters having 1 to 5 carbon atoms of the above polybasic acids.

In general, unsaturated polyester resins are prepared by reacting the polyhydric alcohols and polybasic compounds in substantially equivalent ratios and preferably with an excess of alcohol up to about 15 percent above the stoichiometric quantity required for complete esterification. If polyhydric alcohols containing more than two hydroxyl groups or polybasic compounds having more than two carboxyl groups are utilized, calculation of the molar proportions should be made on a stoichiometric basis so as to make allowance for the additional hydroxyl or carboxyl groups. Similarly, when these resins are to be made flame-retardant and color improved according to this invention, the quantity of polyhalopolyhydromethanonaphthalenedicarboxylic compound and phosphoric acid added should also be considered in determining the mole ratios of reactants according to the well known procedures of the art. Generally, a sufficient quantity of the alcohol and polybasic compound should be reacted so as to produce an ultimate resin having an acid number not greater than about 50 and not lower than about 20, preferably from about 35 to 40, and a hydroxyl number of less than 5.

In preparing polyesters generally, the esterification or polymerization is effected by adding the desired reactants in a predetermined proportion into a suitable esterification flask provided with heating/cooling means, mechanical stirrer, means for passing an inert gas such as nitrogen or carbon dioxide through the reaction mixture, means for removing the water of esterification, an inlet, an outlet and any other accessories necessary for the reaction. The charged materials are then reacted at polymerization conditions at a temperature of from about 100° C. up to about 200° C. and generally about 170° C. If desired, esterification catalysts, such as, p-toluene-sulfonic acid, benzenesulfonic acid, b-naphthalenesulfonic acid or amines, such as, pyridine, triethylamine, or quinoline, may be added to the reaction mixture. Such catalysts, however, are usually desirable only for avoiding severe esterification conditions, and accordingly their use in preparing the resins of this invention is neither necessary nor recommended. A chain stopper may be added during the polymerization reaction in a minor proportion, depending upon the molecular weight of the unsaturated polyester chain desired; in order to rapidly terminate the growth of the unsaturated polyester chain during the polymerization reaction when the desired acid number is being approached; to reduce the number of free carboxyl or hydroxyl groups; or to introduce a hydrocarbon terminal residue. Among the compounds which may be used as chain stoppers during the esterification reaction are a wide variety of monohydric alcohols, such as, butyl, hexyl, octyl, dodecyl, benzyl or tetrahydrofurfuryl or monobasic acids, such as, acetic, propionic, butyric, ethylhexoic or benzoic. The progress of the reaction is followed by measuring the amount of water liberated, by the viscosity of the reaction mixture, by the acid number, by the hydroxyl number or by any other of the methods known in the art. The extent to which the reaction is carried out will depend upon a number of variables, for example, the desired properties of the finished resin, such as, viscosity or melting point. After the desired degree of reaction has been attained, as conveniently determined by employing the acid or hydroxyl number technique, the reaction is stopped and the unsaturated polyester resin is recovered.

If the polyester resin is to be retained in the liquid state, a monomeric, reactive-thinner, such as, styrene is added in combination with additives like polymerization inhibitors, such as hydroquinone. Alternatively, if a solid polyester is desired, the monomeric, reactive-thinner is withheld and the liquid polyester cooled and allowed to solidify. If the solid polyester is desired in a powdered or pulverized form, the solid material is suitably broken up. Additives, such as, stearates may be added to prevent sticking or blocking of the pulverized resin.

To render unsaturated polyester resins prepared according to the general procedure described above, flame-retardant or fire-resistant, the polyhalopolyhydromethanonaphthalenedicarboxylic compound is incorporated into the resin during its preparation. The addition of this compound may be effected by adding it to the polyester during any point in the above described procedure without any substantial departure therefrom. A preferred manner of incorporating the polyhalopolyhydromethanonaphthalenedicarboxylic compound is to first charge only the polyhydric alcohol to the esterification flask, heat the alcohol and then add and blend the polyhalopolyhydromethanonaphthalenedicarboxylic compound into the heated polyhydric alcohol prior to the addition and coreaction of the polybasic compounds. To impart the desired level of flame-retardant properties to the resin, it is generally necessary to add the polyhalopolyhydromethanonaphthalenedicarboxylic compound to the resin during its preparation in a quantity sufficient to impart from about 20 to about 75 weight percent to the final resin.

The addition of the phosphoric acid to the polyester resin during its preparation may be effected at any point in the above described general procedure for preparing polyesters without any substantial or major departure therefrom. The addition of the phosphoric acid to the resin may be either before or after the polyhalopolyhydromethanonaphthalenedicarboxylic compound is added thereto. Generally, however, better improvements in color and transparency are achieved when the phosphoric acid is added to the resin components prior to the addition of the polyhalopolyhydromethanonaphthalenedicarboxylic compound. A satisfactory method for adding the phosphoric acid is to add it to an initial charge of the polyhydric alcohol followed by heating to a melt temperature before the polyhalopolyhydromethanonaphthalenedicarboxylic compound and polybasic compounds are added and coreacted.

The color improved unsaturated polyester resins of the present invention may be prepared according to the above described procedure for preparing polyester resins, the only deviations therefrom being the addition of the polyhalopolyhydromethanonaphthalenedicarboxylic compound and the phosphoric acid at some point in the preparation. By way of illustration and without any limitation in scope intended, the preparation of a color improved unsaturated polyester resin according to this invention having a base formulation comprising ethylene glycol, diethylene glycol, and maleic anhydride may be described as follows.

Ethylene glycol and diethylene glycol are added to a suitable esterification vessel. To the glycol mixture, phosphoric acid is added and the mixture is blanketed with an inert atmosphere of nitrogen and heated to a temperature of about 130° C. The polyhalopolyhydromethanonaphthalenedicarboxylic compound is then added and blended into the glycol-phosphoric acid mixture. The color of the melted mixture is observed at this point in the preparation and it has been observed that the color of the melted mixture is generally darker for similar formulations which do not contain phosphoric acid. The polybasic compound is then added, in this instance, maleic anhydride, while the mixture is being heated to a temperature of about 170° C. The progress of the esterification is indicated by such factors as acid number, hydroxyl number, water liberated. When the reaction has proceeded to the desired degree, the mixture is cooled and the liquid polyester is recovered. The polyester resin may be retained in the liquid state by the addition thereto of a monomeric reactive-thinner, such as for example, styrene. If a solid polyester is desired, the monomeric reactive-thinner is not added and the liquid polyester cooled and allowed to solidify.

The polyhalopolyhydromethanonaphthalenedicarboxylic acids, anhydride or esters thereof which comprises the flame-retardant inducing component of the polyester resins of this invention may be prepared in any suitable manner. A preferred process for preparing the acid or anhydride from which the corresponding diester may be easily prepared by reaction with a lower alkyl alcohol in the presence of a catalyst comprises the Diels-Alder reaction of a conjugated aliphatic diene with an olefinic dicarboxylic acid. Examples of conjugated aliphatic dienes which may be used include 1,3-butadiene, 2-methyl-1,3-butadiene (isoprene), 1,3-pentadiene (piperylene), or 1,3-hexadiene. Olefinic dicarboxylic acids which may be used include maleic acid, fumaric acid, or itaconic acid. The Diels-Alder condensation between the conjugated aliphatic diene and the unsaturated dicarboxylic acid will take place at an elevated temperature in the range of from about 80° to about 250° C. or more and at a pressure sufficient to maintain a major portion of the reactants in a liquid phase, said pressure being in a range of from about atmospheric to about 100 atmospheres or more.

The tetrahydrophthalic acid, anhydride or homologues thereof which result from the aforementioned condensation is then further condensed with a conjugated halo cycloalkadiene to form the desired product. Examples of halo substituted cycloalkadienes which may be used include chloro-substituted 1,3-cyclopentadienes such as 1-chlorocyclopentadiene, 1,5 - dichlorocyclopentadiene, or hexachlorocyclopentadiene. Other cycloalkadienes containing halogen substitutents which may be used include pentachlorocyclohexadiene, pentachlorocyclopentadiene, hexabromocyclopentadiene, etc. The second condensation reaction is also the Diels-Alder type and may be effected at elevated temperature in the range of from about 50° to about 250° C. and at atmospheric or superatmospheric pressures ranging up to about 100 atmospheres or more, the pressure being such as to maintain a major portion of the reactants on the liquid phase at the reaction temperature. If so desired, both Diels-Alder condensations may be effected in the presence of an inert organic solvent, including aromatic solvents such as benzene, toluene, o-xylene, m-xylene, or p-xylene; saturated paraffins and cycloparaffins such as pentane, hexene, heptane, cyclopentane, or methylcyclopentane.

The following examples are given to illustrate the compositions of matter and the method of their preparation according to this invention and are not to be construed as limiting the scope of the invention in strict accordance therewith.

In the following examples, color determinations are made using the Gardner Color Test and color values are reported as Gardner numbers. The Gardner Color Test corresponds to the ASTM specification D1544–58T and consists of a visual comparison of the test sample with Gardner color reference standards. For Gardner numbers 1 to 8 the reference standards are solutions of potassium chloroplatinate and for Gardner numbers above 8, the reference standards are solutions of ferric and cobalt chlorides. For example, a Gardner number of 1 corresponds to the color of 0.550 gram of potassium chloroplatinate in 1000 ml. of 0.1 N HCl, a number of 8 corresponds to the color of 7.900 grams of chloroplatinate in 1000 ml. of 0.1 N HCl, a Gardner color number of 9 corresponds to the color of a solution of 3.8 ml., ferric chloride, 3.0 ml., cobalt chloride and 93.2 ml., hydrochloric acid and a number of 12 corresponds to the color of a solution of 10.8 ml., ferric chloride, 7.6 ml., cobalt chloride and 81.7 ml., hydrochloric acid. Obviously, the higher the Gardner number the darker the color.

EXAMPLE I

Two unsaturated polyester resins, A and B, both having flame retardant properties were prepared from a similar formulation of ethylene glycol, diethylene glycol, 5,6,7,8,9,9-hexachloro-1,2,3,4,4a,5,8,8a-octahydro-5,8 - methano-2,3-naphthalenedicarboxylic anhydride and maleic anhydride. Resin A contained phosphoric acid as an additional component and is a color improved resin of the present invention. Resin B is not according to the present invention.

A.—A color improved unsaturated polyester resin of the present invention having flame retardant properties and containing phosphoric acid as one component thereof and as the color improving ingredient was prepared according to the method of the present invention by charging 16 grams of ethylene glycol, 26 grams of diethylene glycol and 4 grams of phosphoric acid (85% concentration) to an esterification flask equipped with heating/cooling means, mechanical stirrer, means for obtaining an atmosphere of inert gas over the reaction mixture, means for removing water of esterification, temperature recording means, inlet and outlet tubes. The charge was blanketed with an inert atmosphere of nitrogen, agitated, and heated to a temperature of about 130° C. and then 104 grams of 5,6,7,8,9,9-hexachloro-1,2,3,4,4a,5,8,8a - octahydro - 5,8-methano - 2,3 - naphthalenedicarboxylic anhydride were added and blended into the heated charge mixture. The resulting mixture was observed to be almost colorless. Twenty-three grams of maleic anhydride were then added and blended into the charged reactants while the reaction mixture was heated to a temperature of about 155° to 165° C. The water of esterification liberated during the reaction was separated and periodically measured and the acid number of the reaction mixture was also periodically measured to determine the progress of the esterification reaction. When an acid number of about 60 was approached a vacuum was applied to the flask to remove any residual water. The contents of the reaction flask were then poured into a shallow pan and allowed to cool and solidify into a flat sheet. A transparent, hard, brittle unsaturated polyester resin having an acid number of about 40 and a hydroxyl number of less than 5 was obtained. This resin was substantially clear and had a very light color with a Gardner number of 2.

B.—An unsaturated polyester resin having flame-retardant properties and having a formulation similar to A above but not containing the color improving component of phosphoric acid was prepared according to the following procedure. Sixteen grams of ethylene glycol and 26.5 grams of diethylene glycol were charged to an esterification flask. The charge was blanketed with an inert atmosphere of nitrogen, agitated, and heated to about 130° C. then 106 grams of 5,6,7,8,9,9-hexachloro-1,2,3,4,4a,5,8,8a-octahydro-5,8-methano - 2,3 - naphthalenedicarboxylic anhydride were added. The resulting mixture was observed to have a light amber color. Twenty-four and one-half grams of maleic anhydride were then added and blended into the charged reactants while the reaction mixture was heated to a temperature of about 165° to 170° C. When an acid number of about 60 was approached, a vacuum was applied to the flask to remove any residual water. The contents of the reaction flask were then poured into a shallow pan and allowed to cool and solidify into a flat sheet. An amber, hard, brittle, unsaturated polyester resin having an acid number of about 40 and a hydroxyl number of less than 5 was obtained. This resin had a Gardner number of 6 to 7 and compared with resin A above in respect to color was obviously dark.

EXAMPLE II

Two unsaturated polyester resins, C and D, both having flame-retardant properties were prepared from a similar formulation of diethylene glycol, 5,6,7,8,9,9 - hexachloro - 1,2,3,4a,5,8,8a - octahydro - 5,8 - methano - 2,3- naphthalenedicarboxylic anhydride and maleic anhydride. Resin C contained phosphoric acid as an additional component and is a color improved resin of the present invention. Resin D is not according to the present invention.

C.—A color improved unsaturated polyester resin of the present invention having flame-retardant properties and containing phosphoric acid as one component thereof and as the color improving ingredient was prepared according to the method of the present invention by charging 222 grams of diethylene glycol and 16 grams of phosphoric acid (85% concentration) to an esterification flask. The charge was blanketed with an inert atmosphere of nitrogen, agitated, and heated to a temperature of about 130° C. and then 416 grams of 5,6,7,8,9,9-hexachloro- 1,2,3,4,4a,5,8,8a - octahydro-5,8-methano-2,3-naphthalene- dicarboxylic anhydride were added and blended into the heated charge mixture. The resulting mixture was observed to be almost clear and had a light amber color. Ninety-two grams of maleic anhydride were then added and blended into the charged reactants while the reaction mixture was heated to a temperature of about 170° C. The water of esterification liberated during the reaction was separated and periodically measured and the acid number of the reaction mixture was also periodically measured to determine the progress of the esterification reaction. When an acid number of about 60 was approached a vacuum was applied to the flask to remove any residual water. The contents of the reaction flask were then poured into a shallow pan and allowed to cool and solidify into a flat sheet. A transparent, hard, brittle unsaturated polyester resin having an acid number of about 40 and a hydroxyl number of less than 5 was obtained. This resin was substantially clear and had a very light yellow-amber color with a Gardner number of 0 to 1.

D.—An unsaturated polyester resin having flame-retardant properties and having a formulation similar to C above but not containing the color improving component of phosphoric acid is prepared according to the following procedure. Two hundred and twelve grams of diethylene glycol are charged to an esterification flask. The charge is blanketed with an inert atmosphere of nitrogen, agitated, and heated to about 130° C. Then 425 grams of 5,6,7,8,9,9 - hexachloro - 1,2,3,4,4a,5,8,8a-octahydro-5,8- methano - 2,3 - naphthalenedicarboxylic anhydride are added. The resulting mixture is observed to have a dark amber color. Ninety-eight grams of maleic anhydride are then added and blended into the charged reactants while the reaction mixture is heated to a temperature of about 170° C. When an acid number of about 60 is approached, a vacuum is applied to the flask to remove any residual water. The contents of the reaction flask are then poured into a shallow pan and allowed to cool and solidify into a flat sheet. A hard, brittle, unsaturated polyester resin having an acid number of about 40 and hydroxyl number of less than 5 is obtained. This resin has a Gardner number of 6 to 7 and when compared with resin C above in respect to color is obviously dark.

EXAMPLE III

Two unsaturated polyester resins, E and F, both having flame-retardant properties were prepared from a similar formulation of ethylene glycol, 5,6,7,8,9,9 - hexachloro- 1,2,3,4,4a,5,8,8a - octahydro-5,8-methano-2,3-naphthalene- dicarboxylic anhydride and maleic anhydride. Resin E contained phosphoric acid as an additional component and is a color improved resin of the present invention. Resin F is not according to the present invention.

E.—A color improved unsaturated polyester resin of the present invention having flame-retardant properties and containing phosphoric acid as one component thereof and as the color improving ingredient was prepared according to the method of the present invention by charging 139 grams of ethylene glycol and 16 grams of phosphoric acid (85% concentration) to an esterification flask. The charge was blanketed with an inert atmosphere of nitrogen, agitated, and heated to a temperature of about 130° C. and then 416 grams of 5,6,7,8,9,9-hexachloro-1,2,3,4,4a,5,8,8a-octahydro - 5,8 - methano-2,3- naphthalene-dicarboxylic anhydride were added and blended into the heated charge mixture. The resulting mixture was observed to be almost colorless. Ninety-two grams of maleic anhydride were then added and blended into the charged reactants while the reaction mixture was heated to a temperature of about 170° C. The water of esterification liberated during the reaction was separated and periodically measured and the acid number of the reaction mixture was also periodically measured to determine the progress of the esterification reaction. When an acid number of about 60 was approached a vacuum was applied to the flask to remove any residual water. The contents of the reaction flask were then poured into a shallow pan and allowed to cool and solidify into a flat sheet. A transparent, hard, brittle unsaturated polyester resin having an acid number of about 40 and a hydroxyl number of less than 5 was obtained. This resin was substantially clear and had a very light yellow color with a Gardner number of 1.

F.—An unsaturated polyester resin having flame-retardant properties and having a formulation similar to E above but not containing the color improving component of phosphoric acid is prepared according to the following procedure. Two hundred and twelve grams of ethylene glycol are charged to an esterification flask. The charge is blanketed with an inert atmosphere of nitrogen, agitated, and heated to about 130° C. Then 375 grams of 5,6,7,8,9,9-hexachloro-1,2,3,4,4a,5,8,8a-octahydro-5,8- methano - 2,3 - naphthalenedicarboxylic andhydride are added. The resulting mixture is observed to have dark yellow color. Eighty-nine grams of maleic anhydride are then added and blended into the charged reactants while the reaction mixture is heated to a temperature of about 170° C. When an acid number of about 60 is approached, a vacuum is applied to the flask to remove any residual water. The contents of the reaction flask are then poured into a shallow pan and allowed to cool and solidify into a flat sheet. A hard, brittle, unsaturated polyester resin having an acid number of about 40 and a hydroxyl number of less than 5 is obtained. This resin has a Gardner number of 4 to 5 and when compared with resin E above in respect to color is obviously dark.

EXAMPLE IV

Two unsaturated polyester resins, G and H, both having flame-retardant properties were prepared from a similar formulation of propylene glycol, 5,6,7,8,9,9-hexachloro - 1,2,3,4,4a,5,8,8a - octahydro - 5,8 - methano - 2,3- naphthalenedicarboxylic anhydride and maleic anhydride. Resin G contained phosphoric acid as an additional component and is a color improved resin of the present invention. Resin H is not according to the present invention.

G.—A color improved unsaturated polyester resin of the present invention having flame-retardant properties and containing phosphoric acid as one component thereof and as the color improving ingredient was prepared according to the method of the present invention by charging 49 grams propylene glycol and 5.7 grams of phosphoric acid (85% concentration) to an esterification flask. The charge was blanketed with an inert atmosphere of nitrogen, agitated, and heated to a temperature of about 130° C. and then 107.5 grams of 5,6,7,8,9,9-hexachloro-1,2,3,4,4a,5,8,8a - octahydro - 5,8 - methano - 2,3 - naphthalenedicarboxylic anhydride were added and blended into the heated charge mixture. The resulting mixture was observed to be clear and colorless. Twenty-four and nine-tenths grams of maleic anhydride were then added and blended into the charged reactants while the reaction mixture was heated to a temperature of about 170° C. The water of esterification liberated during the reaction was separated and periodically measured and the acid number of the reaction mixture was also periodically measured to determine the progress of the esterification reaction. When an acid number of about 60 was approached a vacuum was applied to the flask to remove any residual water. The contents of the reaction flask were then poured into a shallow pan and allowed to cool and solidify into a flat sheet. A transparent, hard, brittle unsaturated polyester resin having an acid number of about 40 and a hydroxyl number of less than 5 was obtained. This resin was substantially clear and had a very light yellow color with a Gardner number of 2.

H.—An unsaturated polyester resin having flame-retardant properties and having a formulation similar to G above but not containing the color improving component of phosphoric acid was prepared according to the following procedure. Eighty grams of propylene glycol were charged to an esterification flask. The charge was blanketed with an inert atmosphere of nitrogen, agitated, and heated to about 130° C. then 212 grams of 5,6,7,8,9,9-hexachloro - 1,2,3,4,4a,5,8,8a - octahydro - 5,8 - methano-2,3-naphthalene-dicarboxylic anhydride were added. The resulting mixture was observed to have dark amber, brownish color. Forty-nine grams of maleic anhydride were then added and blended into the charged reactants while the reaction mixture was heated to a temperature of about 170° C. When an acid number of about 60 was approached, a vacuum was applied to the flask to remove any residual water. The contents of the reaction flask were then poured into a shallow pan and allowed to cool and solidify into a flat sheet. A hard, brittle, unsaturated polyester resin having an acid number of about 40 and a hydroxyl number of less than 5 was obtained. This resin had a Gardner number of 11 to 12 and compared with resin G above in respect to color was obviously dark.

EXAMPLE V

The following table summarizes the data of Examples I to IV. In the following table, the surprising and novel effect of the present invention can be readily observed. In each example where unsaturated polyester resins of similar formulations are compared, the resin containing phosphoric acid, as an additional component, has a substantial improvement in color. Moreover, the data summarized in the following table demonstrates that in each instance, the darkening effect resulting from the addition of the polyhalopolyhydromethanonaphthalenedicarboxylic compound during the preparation of the resin is retarded by the presence of phosphoric acid.

| Example | Resin | Composition | Containing Phosphoric Acid as Additional Component | Color After Addition of Halogen-Containing Compound* | Color of Finished Resin in Gardner Numbers |
|---|---|---|---|---|---|
| I | A | Ethylene glycol, diethylene glycol, halogen-containing compound*, and maleic anhydride. | Yes | Almost colorless | 2. |
|   | B | Same as resin A | No | Light amber | 6 to 7. |
| II | C | Diethylene glycol, halogen-containing compound*, and maleic anhydride. | Yes | Almost colorless | 0 to 1. |
|   | D | Same as resin C | No | Dark amber | 6 to 7. |
| III | E | Ethylene glycol, halogen-containing compound*, and maleic anhydride. | Yes | Almost colorless | 1. |
|   | F | Same as resin E | No | Dark yellow | 4 to 5. |
| IV | G | Propylene glycol, halogen-containing compound*, and maleic anhydride. | Yes | Almost colorless | 2. |
|   | H | Same as resin G | No | Dark amber, brownish | 11 to 12. |

*5,6,7,8,9,9-hexachloro-1,2,3,4,4a,5,8,8a-octahydro-5,8-methano-2,3-naphthalenedicarboxylic anhydride.

I claim as my invention:

1. A color improved polyester resin comprising the reaction product of at least one polyhydric alcohol, a polybasic compound selected from the group consisting of aliphatic or monocyclic polycarboxylic acids, anhydrides and alkyl esters thereof having from 1 to about 5 carbon atoms per alkyl group, a halogen-containing compound selected from the group consisting of hexahalocto-hydromethanonaphthalenedicarboxylic acids, anhydrides and dialkyl esters thereof having from 1 to about 5 carbon atoms per alkyl group, and phosphoric acid.

2. The color improved unsaturated polyester resin according to claim 1 characterized in that the halogen-containing compound is selected from the group consisting of 5,6,7,8,9,9-hexachloro-1,2,3,4,4a,5,8,8a - octahydro - 5,8-methano-2,3-naphthalenedicarboxylic acid and the anhydride and esters thereof.

3. The color improved unsaturated polyester resin according to claim 1 characterized in that the phosphoric acid is present in an amount of from about 0.5 to about 4 weight percent of said resin.

4. The color improved unsaturated resin according to claim 1 characterized in that the halogen-containing compound is present in an amount of from about 20 to about 75 weight percent of said resin.

5. The color improved unsaturated polyester resin according to claim 1 characterized in that it is the reaction product of ethylene glycol, diethylene glycol, maleic anhydride, 5,6,7,8,9,9 - hexachloro-1,2,3,4,4a,5,8,8a-octahydro-5,8-methano-2,3 - naphthalenedicarboxylic anhydride and phosphoric acid.

6. The color improved unsaturated polyester resin according to claim 1 characterized in that it is the reaction product of diethylene glycol, maleic anhydride, 5,6,7,8,9,9-hexachloro-1,2,3,4,4a,5,8,8a-octahydro - 5,8-methano-2,3-naphthalenedicarboxylic anhydride and phosphoric acid.

7. The color improved unsaturated polyester resin according to claim 1 characterized in that it is the reaction product of ethylene glycol, maleic anhydride, 5,6,7,8,9,9-hexachloro-1,2,3,4,4a,5,8,8a-octahydro - 5,8-methano-2,3-naphthalenedicarboxylic anhydride and phosphoric acid.

8. The color improved unsaturated polyester resin according to claim 1 characterized in that it is the reaction product of propylene glycol, maleic anhydride, 5,6,7,8,9,9-hexachloro-1,2,3,4,4a,5,8,8a-octahydro - 5,8-methano-2,3-naphthalenedicarboxylic anhydride and phosphoric acid.

9. A method for preparing a color improved polyester resin which comprises reacting at polymerization conditions, at least one polyhydric alcohol, a polycarboxylic compound selected from the group consisting of aliphatic or monocyclic polycarboxylic acids, anhydrides and alkyl esters thereof having from 1 to about 5 carbon atoms per alkyl group, a halogen-containing compound selected from the group consisting of hexahalooctahydromethanonaphthalenedicarboxylic acids, anhydrides and dialkyl esters thereof having from 1 to about 5 carbon atoms per alkyl group and phosphoric acid.

10. The method for preparing a color improved unsaturated polyester resin according to claim 9 characterized in that the halogen-containing compound is selected from the group consisting of 5,6,7,8,9,9-hexachloro-1,2,3,4,4a,5,8,8a-octahydro-5,8-methano - 2,3 - naphthalenedicarboxylic acid and the anhydride and esters thereof.

11. The method for preparing a color improved polyester resin according to claim 9 characterized in that the phosphoric acid is reacted in a quantity sufficient to impart a phosphoric acid content of from about 0.5 to about 4 weight percent to the resin.

12. The method for preparing a color improved polyester resin according to claim 9 characterized in that the halogen-containing compound is reacted in a quantity sufficient to impart a halogen-containing compound content of from about 20 to about 75 weight percent to the resin.

13. The method for preparing a color improved unsaturated polyester resin according to claim 9 characterized in that ethylene glycol, diethylene glycol, maleic anhydride, 5,6,7,8,9,9-hexachloro - 1,2,3,4,4a,5,8,8a-octahydro-5,8-methano-2,3 - naphthalenedicarboxylic anhydride and phosphoric acid are reacted.

14. The method for preparing a color improved unsaturated polyester resin according to claim 9 characterized in that diethylene glycol, maleic anhydride, 5,6,7,8,9,9-hexachloro-1,2,3,4,4a,5,8,8a-octahydro - 5,8-methano-2,3-naphthalenedicarboxylic anhydride and phosphoric acid are reacted.

15. The method for preparing a color improved unsaturated polyester resin according to claim 9 characterized in that ethylene glycol, maleic anhydride, 5,6,7,8,9,9-hexachloro-1,2,3,4,4a,5,8,8a-octahydro-5,8 - methano-2,3-naphthalenedicarboxylic anhydride and phosphoric acid are reacted.

16. The method for preparing a color improved unsaturated polyester resin according to claim 9 characterized in that propylene glycol, maleic anhydride, 5,6,7,8,9,9-hexachloro-1,2,3,4,4a,5,8,8a-octahydro - 5,8-methano-2,3-naphthalenedicarboxylic anhydride and phosphoric acid are reacted.

References Cited

UNITED STATES PATENTS

| | | | |
|---|---|---|---|
| 2,931,746 | 4/1960 | Robitschek et al. | 260—75 |
| 3,105,087 | 9/1963 | Roberts et al. | 260—75 |
| 3,196,191 | 7/1965 | Haigh et al. | 260—75 |
| 3,275,606 | 9/1966 | Kujawa et al. | 260—75 |

WILLIAM H. SHORT, *Primary Examiner.*

L. P. QUAST, *Assistant Examiner.*